Aug. 9, 1960 M. C. YEASTING 2,948,463
MECHANICAL CHART READING DEVICE
Filed March 4, 1957 5 Sheets-Sheet 1
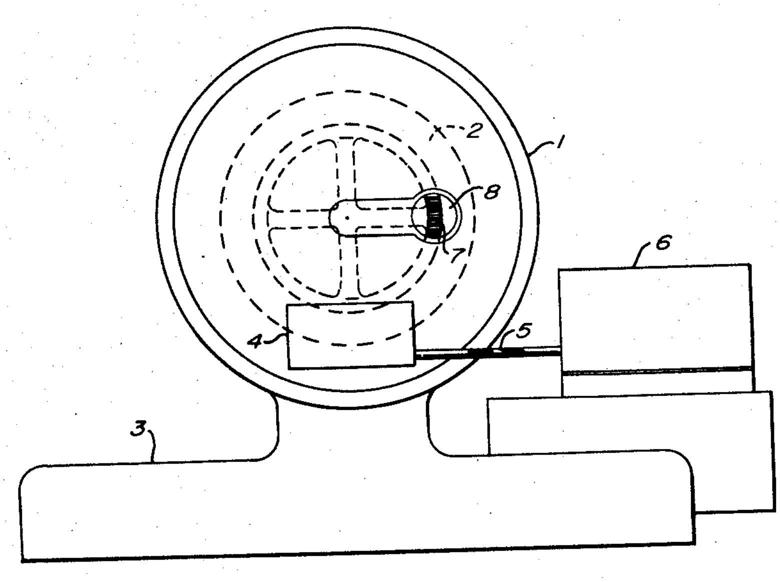
Fig. I
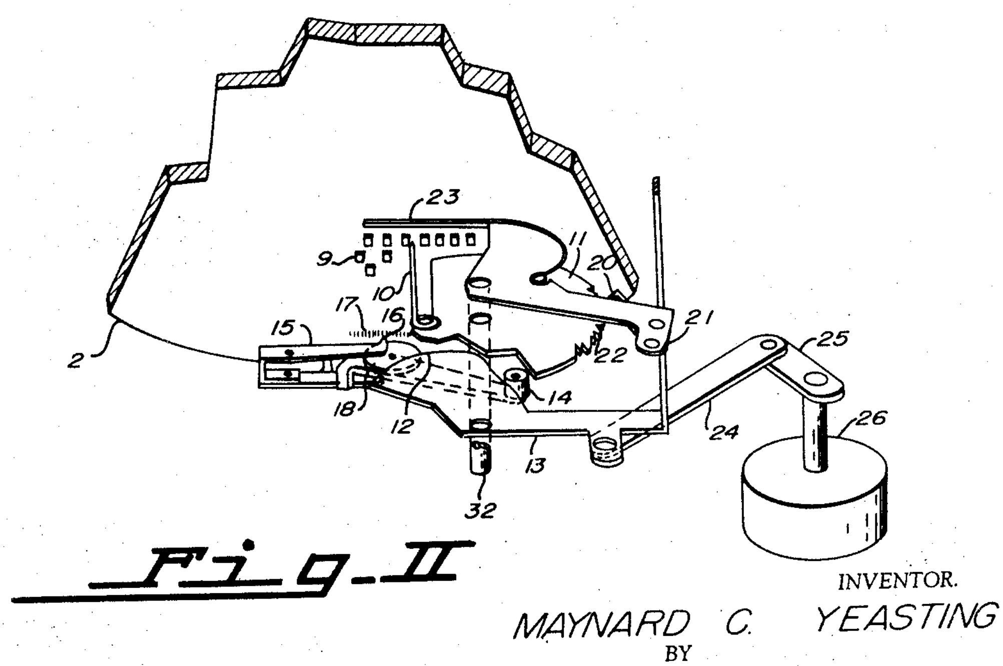
Fig. II
INVENTOR.
MAYNARD C. YEASTING
BY
Marshall, Marshall and Yeasting
ATTORNEYS Aug. 9, 1960 M. C. YEASTING 2,948,463
MECHANICAL CHART READING DEVICE
Filed March 4, 1957 5 Sheets-Sheet 2
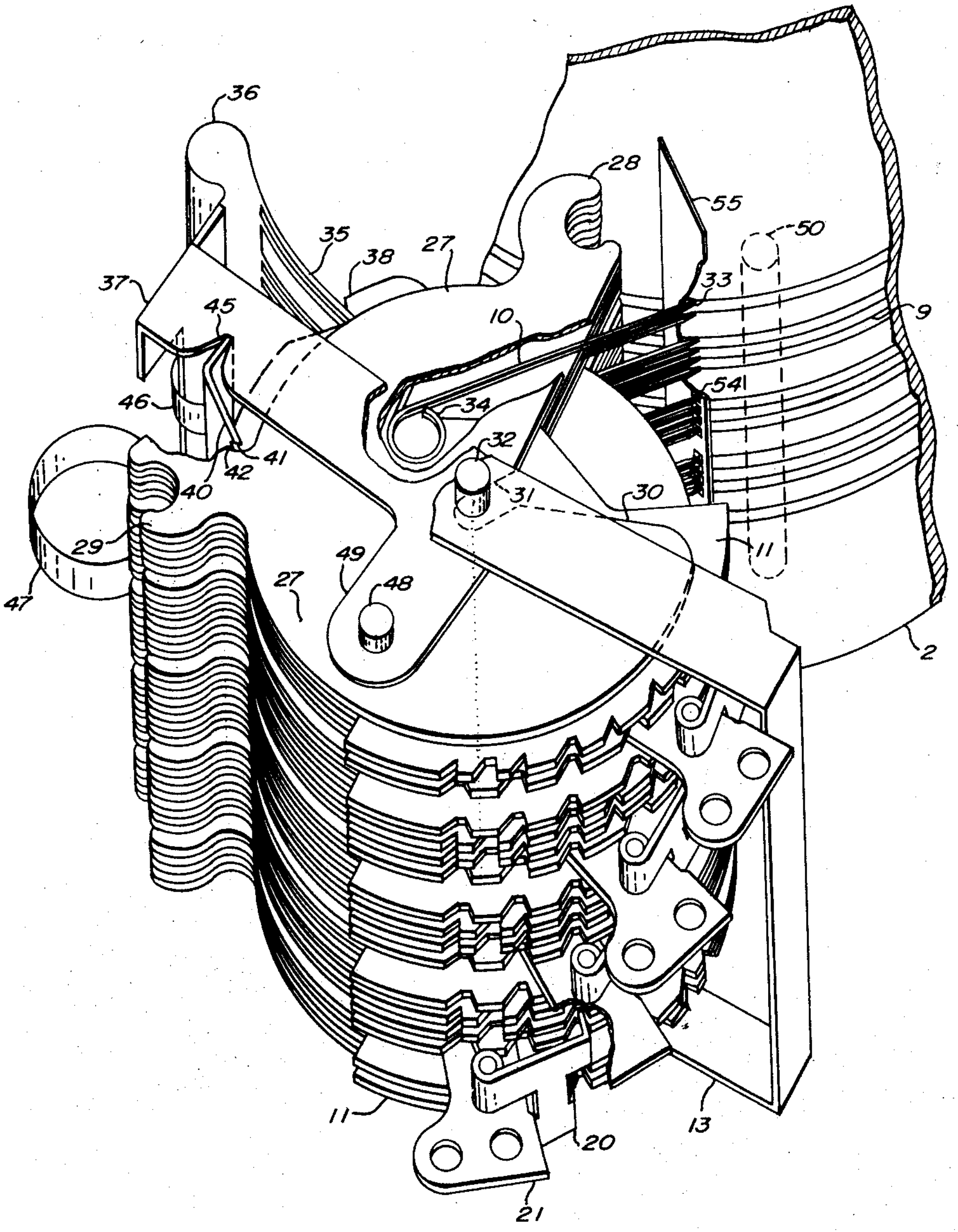
Fig. III
INVENTOR.
MAYNARD C. YEASTING
BY
Marshall, Marshall and Yeasting
ATTORNEYS Aug. 9, 1960 M. C. YEASTING 2,948,463
MECHANICAL CHART READING DEVICE
Filed March 4, 1957 5 Sheets-Sheet 3
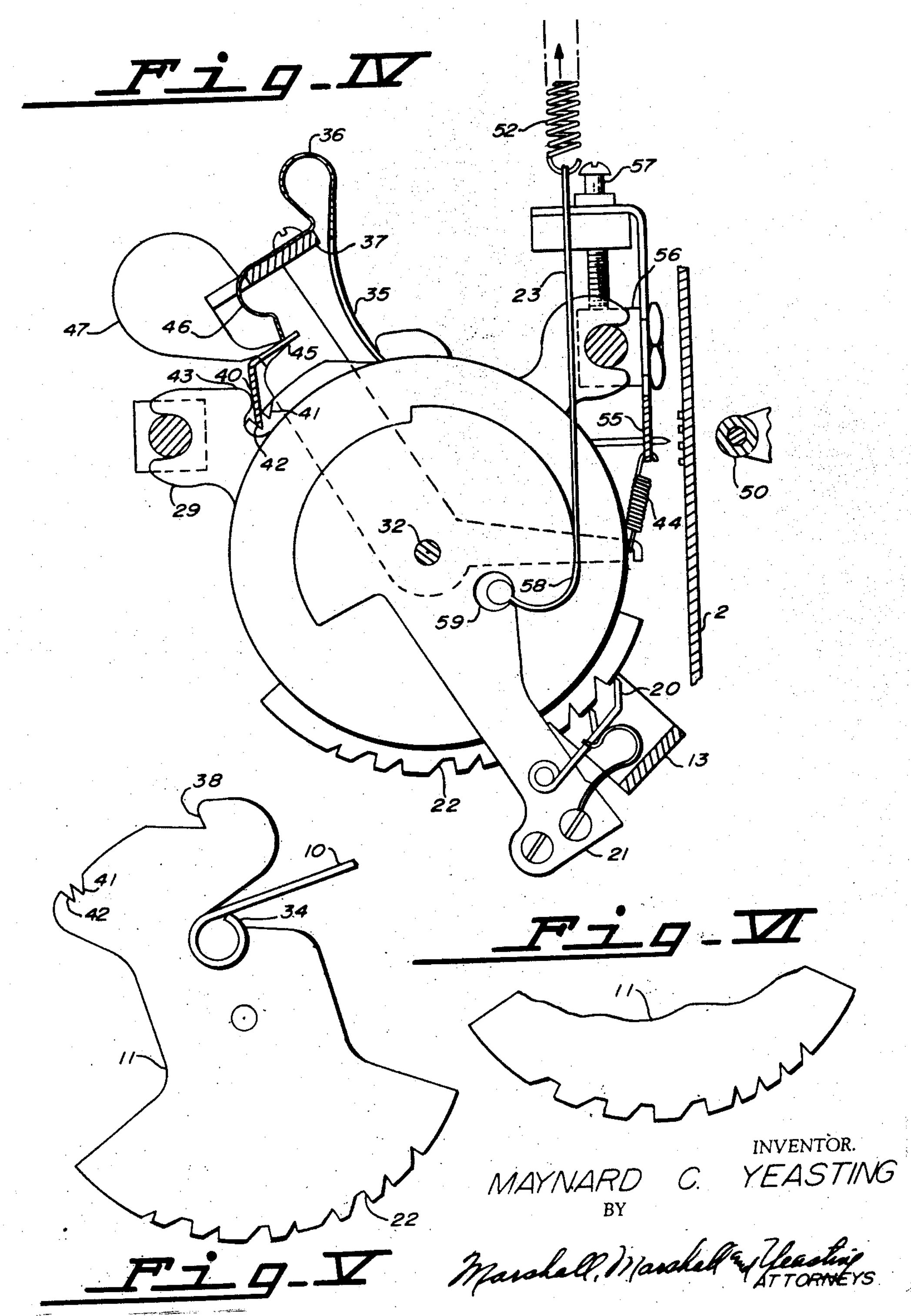
Fig. IV, Fig. V, Fig. VI
INVENTOR.
MAYNARD C. YEASTING
BY
Marshall, Marshall and Yeasting
ATTORNEYS

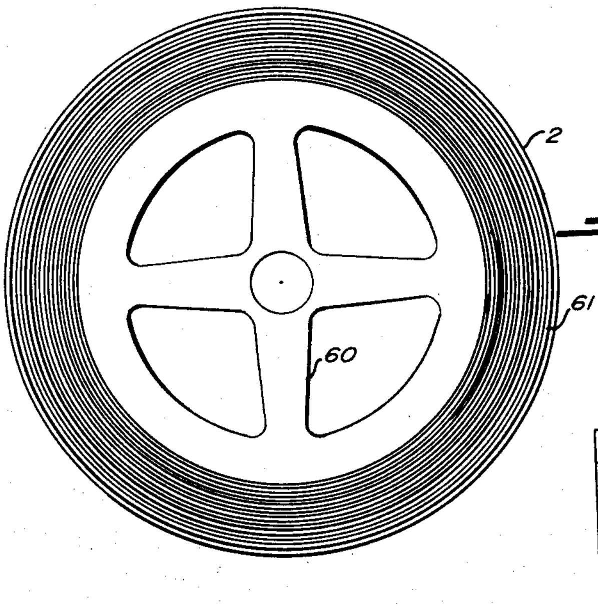
Fig. VII
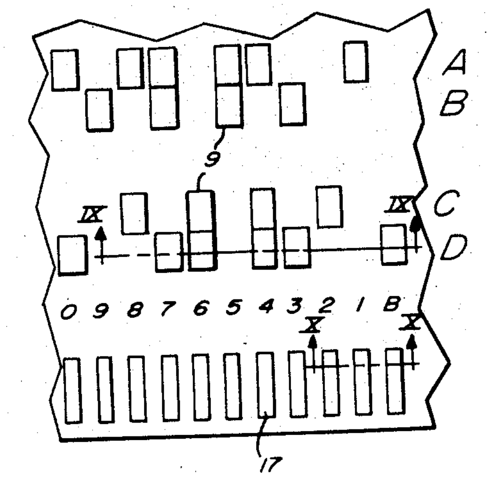
Fig. VIII
| CODE | | | | |
|---|---|---|---|---|
| | A | B | C | D |
| BLANK | | | | D |
| 0 | A | | | D |
| 1 | A | | | |
| 2 | | | C | |
| 3 | | B | | D |
| 4 | A | | C | D |
| 5 | A | B | | |
| 6 | | | C | D |
| 7 | A | B | | D |
| 8 | A | | C | |
| 9 | | B | | |
Fig. XI
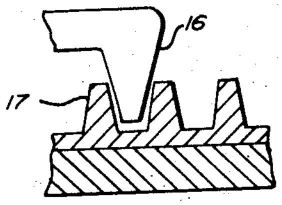
Fig. X
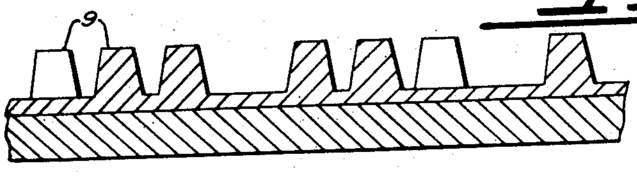
Fig. IX
INVENTOR.
MAYNARD C. YEASTING
BY
Marshall, Marshall & Yeasting
ATTORNEYS

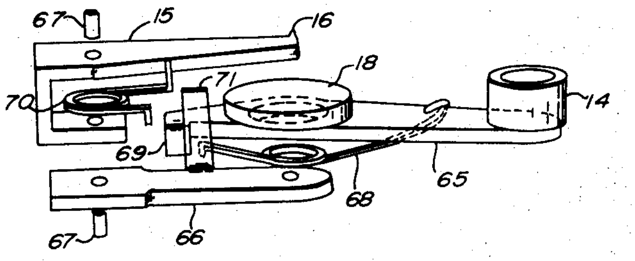
Fig. XII
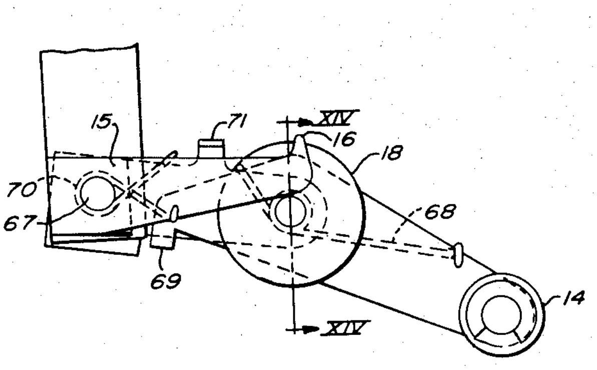
Fig. XIII
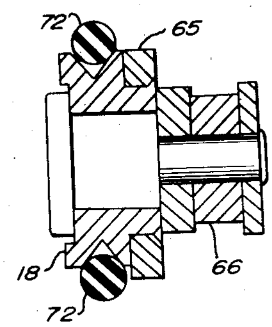
Fig. XIV
INVENTOR.
MAYNARD C. YEASTING
BY
Marshall, Marshall & Yeasting
ATTORNEYS United States Patent Office 2,948,463

Patented Aug. 9, 1960

2,948,463

MECHANICAL CHART READING DEVICE

Maynard C. Yeasting, Elmore, Ohio, assignor, by mesne assignments, to Toledo Scale Corporation, Toledo, Ohio, a corporation of Ohio Filed Mar. 4, 1957, Ser. No. 643,708

3 Claims. (Cl. 235—1)

This invention relates to mechanical chart reading devices for use in connection with condition responsive instruments or mechanisms to sense the position of the condition responsive member and convert such information as received therefrom into a form suitable for operating indicating or recording devices.

As industrial processes and inventory control using condition responsive instruments become more and more exact there is a need for a corresponding increase in the accuracy of reading and recording the indications of the instruments. While the reading device constructed according to the invention may be applied to various types of condition responsive mechanism it is, for illustrative purposes only, described in connection with its use in a weighing scale for reading the graduations of a chart that moves according to the weight of a load being weighed and setting mechanism for visual display or printing of weight indications in digital form. The accuracy of a digital indication is limited only by the number of places into which the recording may be resolved. In order to get high accuracy it is necessary to graduate the chart with finely spaced graduations and the difficulty of reading, particularly by mechanical means, is thereby materially increased.

The principal object of this invention is to provide a chart reading mechanism that is simple in operation, reliable and extremely accurate.

Another object of the invention is to provide a chart reading mechanism that senses a chart during a small fraction of a reading interval and then converts the readings to a visual indication or recordable indication after the chart has been released so that it may follow further changes in the condition being measured.

A still further object of the invention is to provide a simple drive mechanism for operating the chart sensing members of the reading device so as to accurately read the chart without transmitting large forces to the chart or requiring high positional accuracy of the chart in the direction of movement of the sensing members.

Another object of the invention is to provide a permutation reading device in which the permutation members are continually urged in a direction to sense the chart and are limited in their movement in such direction either by engagement of sensing pins, operatively connected to the members, with the chart or by means of a common restraining member engaging all of the permutation members.

A still further object of the invention is to provide a permutation reading device in which the sensing movement of the permutation members is large compared to the relative movement between the members required to make a selection according to the chart indicia.

A still further object of the invention is to provide a simplified permutation device in which the permutation members are driven against the chart through a comparatively large distance and then retracted without disturbing their relative positions as determined by engagement with the chart.

These and other objects and advantages are obtained in a permutation reading device constructed according to the invention.

According to the invention a plurality of cooperating permutation members are individually urged in a direction to engage relatively raised and depressed surfaces of a chart and are retracted from engagement with the chart by means of a common pawl that selectively engages one of two notches in each of the permutation members so as to retract such members without disturbing their relative positions. The common pawl in fully retracted position locks the permutation members against relative motion so that notched peripheries of the members may be searched for aligned notches corresponding to the relative positions as determined by a permutation code.

A preferred form of the invention is illustrated in the accompanying drawings.

In the drawings:

Figure I is an elevation of a weighing scale dial mechanism showing the location of the reading device and a recording device operated thereby as they are mounted on a weighing scale mechanism.

Figure II is a fragmentary schematic diagram to illustrate some of the operating principles of the mechanism.

Figure III is a dimetric view of the permutation members and the drive mechanism therefor to show their cooperation with each other and with the chart.

Figure IV is a horizontal section through the lower portion of the assembly of permutation members to show the cooperation between the permutation members and the drive therefor.

Figure V is a plan view of one of the permutation members to show its notch pattern.

Figure VI is a fragmentary plan view of the notched portion of another permutation member to show a second notch pattern.

Figure VII is a front elevation at reduced scale of a weighing scale chart suitable for use with the permutation reading device.

Figure VIII is an enlarged fragment of the graduated portion of the weighing scale chart illustrated in Figure VII.

Figure IX is a section at enlarged scale taken substantially along the line IX—IX of Figure VIII to illustrate the shape of the individual chart graduations.

Figure X is a section at enlarged scale taken along the line X—X of Figure VIII to show the shape of locating notches employed to locate the chart prior to taking a reading.

Figure XI is a table showing the permutation code used for each of the graduations of the chart.

Figure XII is an exploded view of locating mechanism employed to center the chart graduations prior to taking a reading so as to avoid any possibility of selector pins of the permutation members failing to properly engage the chart graduations.

Figure XIII is a plan view of the locating device.

Figure XIV is a vertical section along the line XIV—XIV of Figure XIII.

These specific figures and the accompanying description are intended merely to illustrate the invention and not to impose limitations on its scope.

For purpose of illustration the device is shown in connection with an ordinary dial type weighing scale. Such a scale comprises a dial housing 1 that contains automatic load counterbalancing and indicating mechanism which includes a chart 2 that is rotated through increments of angle that are proportional to increments of weight applied to the scale. The chart housing 1 is mounted on the top of a scale column 3 of which only the top portion is shown in Figure I.

The chart reading mechanism of the invention is contained within a housing 4 attached to the dial housing 1 and is connected through a conduit 5 to a printer or other utilization device 6 which is to be operated according to the scale readings. The chart 2 has on its face a series of graduations 7 that are visible through a magnifying lens 8 to provide visual indications of the load on the scale. The face of the chart 2 is also provided with molded graduations or indicia 9 consisting of raised surfaces, as shown in greater detail in Figures VIII, IX, and X, constituting the indicia that are sensed by the reading device contained within the housing 4.

Figure II shows in schematic form one of each of the essential elements of the reading device while Figure III shows a complete assembly of the sensing and selecting portions of the reading device. Referring first to Figure II a reading of the chart 2 is taken by first advancing a series of sensing pins 10, one of which is shown, by spring-urged rotation of permutation disks 11 to positions at which they are arrested by engagement or non-engagement of the sensing pins 10 with the indicia 9 of the chart 2. Prior to the engagement of the sensing pins 10 with the indicia 9 a cam 12 forming part of a drive member 13, through engagement with a roller 14, drives a resiliently mounted finger 15 toward the chart until its tip 16 engages a row of raised teeth 17 and comes to rest either between adjacent teeth or on the crest of a tooth. Continued motion of the cam follower 14 turns a rubber tired wheel 18 in a direction tending to move the chart 2 so that the tip of the finger 16, if it had lodged on a crest of a tooth 17, is permitted to enter the space between two of the teeth and thus locate the chart 2. If the tip 16 were already engaged in a space between two of the teeth 17 the wheel slips leaving the chart 2 in position with the corresponding graduation centered in the path of the sensing pins 10. Thus, the pins 10 either enter squarely into the spaces between indicia 9 or onto the crests depending upon the coding of the indicia for that particular graduation.

After the permutation disks 11 are retracted, without disturbing their relative positions as determined by the engagement of the sensing pins 10 with the chart 2, search pawls 20, one for each decade, carried on pawl carriers 21 and each cooperating with four of the permutation disks 11 search notches 22 in the peripheries of the permutation disks 11. As each pawl finds aligned notches in its set of four permutation disks 11 it stops its associated pawl carrier in a position corresponding to the particular graduation of the chart being sensed. The stopped pawl carriers, through their connections through cables 23, position a reading device or indicating device according to the sensed graduation.

The movement of the drive member 13 is produced and controlled by a connecting rod 24 and crank 25 driven by a motor 26 equipped with controls to cause it to drive the crank 25 through one revolution for each start signal.

The sequence of steps in thus taking a reading from the chart 2 is to energize the motor such that it turns the crank 25 and thus oscillates the drive member 13. This oscillation first drives the cam follower 14 and finger 15 toward the chart to locate it with a graduation accurately in line with the sensing pins 10. During the oscillation of the drive member 13 the permutation disks 11, four for each decade, are driven so that their respective pins 10 engage the chart and then are retracted without disturbing their relative positions with respect to each other to a locking position at which they are held while the searching pawls 20, one for each group of four permutation disks or one for each decade, search the peripheries of the permutation disks 11 for the aligned notches. Upon finding the aligned notches the pawls stop the respective pawl carriers 21 in proper indicating positions.

The whole combination or assembly of permutation disks and drive members is shown in greater detail in Figure III. The complete stack up of permutation disks 11 for a four place number includes sixteen of the permutation disks 11, four pawl carriers 21, and enough spacers 27 to separate each of the permutation disks 11 from its neighbor or from a pawl carrier 21 as the case may be. Thus, sixteen permutation disks 11 and four pawl carriers 21 plus an extra spacer at the top of the stack requires a total of twenty-one spacers 27. Each of the spacers is provided with a pair of bifurcated ears 28 and 29 adapted to slip into notches in support rods of a frame with the rods holding the spacers in alignment and in spaced relation. Each of the spacers, on the side facing the chart, also has an inwardly directed notch 30 that terminates in a narrow slot 31 adapted to fit into a corresponding groove cut in an axle 32 on which the permutation disks 11 and pawl carriers 21 are journaled. Thus, each of the spacers 27 has a three point support so as to separate the permutation disks and still allow them to move easily as may be required in sensing the chart or in carrying the pawls 20 along the notched peripheries of the permutation disks 11.

The sensing pins 10 each have a pointed end 33 that is sharp enough to enter the spaces between alternate graduations and yet blunt enough to avoid cutting the chart material and has its other end curled into a circular loop 34 that is a close sliding fit in a hole cut in the connected permutation disk 11 so that the pin moves in the manner of a flat ball and socket joint. This particular construction keeps the thickness of the permutation disk and pin a minimum so that it may fit between closely spaced adjacent spacers 27.

The permutation disks 11 are continually urged in a direction tending to drive the sensing pins 10 against the chart by spring teeth 35 of a comb spring 36 that is carried on a common pawl bail 37. The ends of the spring teeth 35 engage notches 38 in the permutation disks. Movement of the permutation disks 11 under the influence of the springs 35 is limited by a common pawl 40 that is carried in the bail 37 and arranged to selectively engage either of two notches 41 or 42 of each permutation disk 11 and lock it in position when the pawl engages hook-like portions 43 (Figure IV) of the bifurcated ears 29 as the bail 37 is urged counterclockwise, as seen in Figures III and IV, by a return spring 44 attached to its lower end. The common pawl 40 is held seated in pivot notches 45 of the bail 37 by a plurality of small springs 46 forming part of the comb spring 36 and attached to the bail 37. The pawl 40 is urged into engagement with the notches 41 or 42 by a light spring 47 also attached to the bail 37.

In operation, as the drive member 13 is swept clockwise as seen in Figures III or IV it collects the pawl carriers 21 from their previous positions and finally engages an upwardly directed stud 48 carried in an upper arm 49 of the bail 37 so as to drive the bail clockwise through a small distance against the tension of the return spring 44. During the initial movement of the bail 37 it and the permutation disks 11 move as a unit since the disks are held between the spring teeth 35 engaging the notches 38 and the pawl 40 engaging the notches 41 or 42. As the sensing pins 10 engage the chart 2 and drive it against a backup roller 50 the motion of the permutation disks 11 is arrested. The spring teeth 35 yield as the bail 37 continues and the pawl 40 leaves the notches 41 or 42 and slides part way along the smooth periphery of the permutation disks 11 between the notches 41 and 38. This motion is just enough to make sure that the common pawl 40 is out of the notches. On the return motion of the drive member 13 the spring 44 pulls the common pawl bail 37 counterclockwise so that the common pawl 40 may enter the aligned ones of the notches 41 or 42 in each of the permutation disks according to whether the disk had been advanced by its pin finding a low spot in the chart or whether it had been arrested in the first position with the pin on the crest of a graduation. The continued motion with the common pawl 40 engaged in the permutation disks drives the disks in retracting motion until the common pawl 40 seats behind the hook-like portions 43 of the spacer ears 29. At this point the motion of the common pawl bail 37 is arrested and the permutation disks 11 are all locked in position.

Continuing motion of the drive member 13 allows the pawl carriers 21 to follow as urged by their drive spring 52, one of which is shown in Figure IV connected to its cable 23. The pawl carriers 21 move until their pawls 20 find aligned notches in a particular combination of permutation disks with which they cooperate. It is to be noted that the position of the aligned notches may vary according to the relative positions of the group of disks cooperating with each pawl.

The sensing pins 10 adjacent the chart 2 are guided in slots 54 of a guide plate 55 that is attached to a frame support 56 that serves as the spacing support for the bifurcated ears 28 of the spacers 27. The slots 54 are just wide enough to admit the pins and thus accurately guide them closely adjacent the chart 2. As indicated in Figure IV, the guide plate 55 is adjustable relative to the frame support rod 56 and is controlled by an adjusting screw 57 that works in opposition to the common pawl bail return spring 44.

The return springs 52 may be the springs in the printer mechanism to maintain tension on the cables 23 or if a commutator, not shown in the drawings, be attached to the pawl carriers 21 the springs 52 may be returned to the frame mechanism merely to apply tension to the cable 23 and do no other useful work. If a printer, as indicated in Figure I, is enclosed in the housing 6 the cables 23 are run through the conduit 5 from the selector mechanism in the housing 4.

Referring to Figure IV, each cable 23 is passed over an arcuate surface or periphery 58 of its pawl carrier 21 and its end is anchored in a hole 59 drilled through the pawl carrier. The spacers 27 hold the cable 23 from slipping off sideways. The radius of the arcuate surface 58 with respect to the axle 32 on which the pawl carrier is journaled is selected according to the desired travel of the cable 23 for each increment of indication and the spacing of the notches 22 which determine the angular travel of the pawl carrier.

The permutation disks 11 are made with either of two notch patterns and the selector pawls 20 are arranged with one of its teeth advanced two notch spaces ahead of the other tooth. By thus varying the spacing of the pawl teeth and providing the two different patterns for the selector disks it is possible to secure at least eleven different combinations to provide different stopping points for the pawl 20. Figures V and VI show the two notch combinations for the permutation disks 11. In the type shown in Figure V the notched periphery is divided into twenty-three equal spaces with notches appearing in the first, third, fourth, sixth, ninth, tenth, twelfth, fifteenth, seventeenth, eighteenth, twentieth, and twenty-third spaces counting from left to right. Likewise the permutation pattern shown in Figure VI has notches appearing in the first, second, fifth, sixth, ninth, tenth, thirteenth, fourteenth, seventeenth, nineteenth, twenty-first, and twenty-third spaces. These particular notch combinations used in pairs with the offset pawl teeth operate according to the code set forth in Figure XI. This code is used in determining the location of the raised indicia for each of the graduations on the chart 2 to be sensed.

As shown in Figure VII, the chart 2 is an annular member carried on a spider 60 and having rows of graduations 61 on its marginal area. The graduations or indicia are preferably molded in the face of the chart in the same manner as phonograph records are made with a plastic layer mounted on a metallic backing plate and the graduations being formed in the plastic layer. The arrangement of graduations for a first fragment of the chart is illustrated in Figure VIII. This fragment, starting with the zero indicia of the chart, shows only those graduations in the units or lowest order decade and the row of teeth 17 for locating the chart. The teeth 17 along the marginal area of the chart cooperate with the locating finger 15 and have cross sections as shown in Figure X wherein each of the teeth is shown substantially as a conventional rack tooth. The tip 16 of the locating finger 15 is formed as a mating tooth so as to seat firmly in the spaces between the teeth 17.

The indicia 9 with which the sensing pins 10 cooperate are of generally similar shape except for being formed of heavier section inasmuch as the locating pins do not have to fit into the spaces between teeth that are located on adjacent graduations. The chart section shown in Figure VIII, as was mentioned, includes that portion starting at the zero graduation which is shown at the right-hand edge. Inasmuch as there are no significant figures to the left of the zero when indicating the zero graduation it is desirable that the indicator show or the printer print a blank at this position. Therefore, the first graduation carries only the single raised portion in the bottom row or D row which, according to the chart shown in Figure XI, gives a blank for the output indication. The permutation disk combination for this graduation causes the aligned notch to appear at the end of the travel of the pawls 20 or at the last possible position at which an aligned notch may be formed. If an error is made such that the pawl does not find the aligned notch it overtravels and the printer indicates such overtravel by printing some distinctive symbol in place of a digit. The next position, to indicate a "zero," has raised indicia in the A and D rows. The next graduation, a "one," is indicated or denoted by a single raised indicia in the A row; likewise "two" is indicated by a single indicia in the C row; and the others follow according to the chart. It should be noted that the raised indicia of the chart cause the corresponding permutation disk 11 to be advanced counterclockwise one space as seen in Figure III or IV.

Other chart combinations may be employed besides the particular code indicated. However, this particular code was selected in order that the number of different parts could be reduced. Thus, with the selected code two each of the permutation disks 11, shown in Figures V and VI, may be employed in each decade in combination with the offset pawl 20. If the offset pawl were not employed then each of the four permutation disks cooperating for each decade would have to have its own combination of notches which would make four different parts to be stocked instead of two.

The chart locating mechanism is illustrated in greater detail in Figures XII, XIII and XIV. Referring to Figure XII, the cam follower 14 is mounted on the end of a forearm 65 that also carries, as a rigid part thereof, at its elbow end the drive wheel 18 that engages the chart to urge it forward so as to move any tooth 17 falling below the finger tip 16 out of the way and allow the tip 16 of the finger 15 to fall into the space between adjacent teeth 17. The arm 65 is pivotally connected through an elbow joint at the axis of the wheel 18 to a second arm 66 which in turn is pivoted on and, by a spring not shown, is continually urged clockwise about a pin 67 fixed in the framework of the scale. A spring 68 at the joint or elbow at the wheel 18 urges the forearm 65 clockwise with respect to the second arm 66 so that the wheel bears against the chart 22 before the elbow joint starts to turn. The spring urged movement of the forearm 65 relative to the second arm 66 is limited by a down turned ear 69 on the tail end of the forearm 65 that engages the front surface of the lower arm 66. Normally, the spring 68 rotates the forearm 65 to maintain the ear in engagement with the lower arm. However, when the mechanism is pushed toward the chart by the cam pushing on the cam roller 14 the lateral motion of the wheel 18 is arrested and the cam force against the cam follower 14 then rotates the arm 65 around its connection with the lower arm 66 thus producing the relative rotation of the wheel 18.

The finger 15 with its tip 16 is carried on the pin 67 and is urged toward the chart by a spring 70 acting between the lower arm 66 and the finger 15. The forward movement of the finger 15 is limited by a stop 71 erected from the rear portion of the lower arm 66 in position to engage the chart side of the finger 15.

Figure XIV is a section taken through the elbow joint between the arms 65 and 66 and shows a rubber tire 72 mounted on the wheel 18 so as to increase the tractive effort of the wheel on the chart.

In the operation of this mechanism the spring 68 is made stiff enough so that when the wheel 18 engages the chart it pushes the chart back against the backup roller 50 before the spring 68 yields and permits the arm 65 to turn relative to the arm 66. This insures that sufficient force is exerted against the chart to cause it to move even though the tip 16 of the finger 15 should be partially caught on the corner of the crest of a tooth. It is necessary that sufficient force be exerted at this time so that the tip of the finger 15 will slide across the crest of a tooth 17 and firmly engage in the valley against the side of the next tooth 17.

The selecting mechanism and arrangement for driving the permutation disks 11 provides in a simple structure means for positively advancing the disks and pins into engagement with the chart to positions that are limited by the engagement of pins with the indicia of the chart and then retracting the disks and pins without disturbing their relative positions. This reliably sets up the permutation disks 11 so that they may be readily sensed by the searching pawls 20 in determining and transmitting the chart indication to a printer or other indicia display mechanism without requiring high accuracy of positioning of the chart in the direction of movement of the sensing pins 10.

Various modifications in the structure may be made without losing the advantages of the structure disclosed or departing from the scope of the invention.

Having described the invention, I claim:

1. A chart sensing and translating device comprising, in combination, a chart having raised indicia, a plurality of sensing pins adapted to engage the indicia, a plurality of permutation members individually connected to the pins, each of said members having a smooth peripheral section and a first and second notch spaced in the direction of movement of the member, a bail movable along the periphery of the members, springs individually connecting each member to the bail for urging the member in a direction to drive its pin against the chart, a pawl mounted on the bail and adapted to engage the notches to oppose spring urged movement of the members, and means for moving the bail toward the chart until the pawl is disengaged from the notches and engaged with the smooth peripheral section of at least one member as its pin engages the indicia on the chart and arrests the movement of said member, and means for moving the bail in a return direction during which the pawl leaves the smooth section and selectively engages the notches according to the arrested position of the members to move the members to retracted positions that vary according to the arrested positions.

2. A sensing device according to claim 1 in which the springs are resilient teeth of a comb attached to the bail.

3. A chart sensing and translating device comprising, in combination, a chart having raised indicia, a plurality of permutation disks each having a pin engageable with the chart indicia, each of said disks having a smooth peripheral section including a first and a second notch spaced in the direction of travel of the disk, a bail movable along the peripheral section of the disks, springs individuall connecting the disks to the bail and urging the disks in a direction to drive the pins against the chart, a pawl mounted on the bail and engageable with the notches to oppose spring urged movement of the disks, means for moving the bail in a first direction until the engagement of the pins with the chart indicia arrests the motion of the disks according to the indicia and the pawl disengages the notches and engages the smooth peripheral surface of the first arrested disk, and means for moving the bail in a second direction during which the pawl is guided by the smooth peripheral section over the notches aligned therewith and into the notches aligned according to the arrested positions of the disks and the pawl moves the disks to retract the pins from the chart.

References Cited in the file of this patent

UNITED STATES PATENTS 2,232,824 Maschmeyer ------------- July 6, 1943
2,792,275 Drillick --------------- May 14, 1957